Dec. 9, 1969     J. P. GAFFARD     3,482,448
DIFFERENTIAL RADIATION PYROMETER SYSTEM
Filed April 13, 1966     5 Sheets-Sheet 1
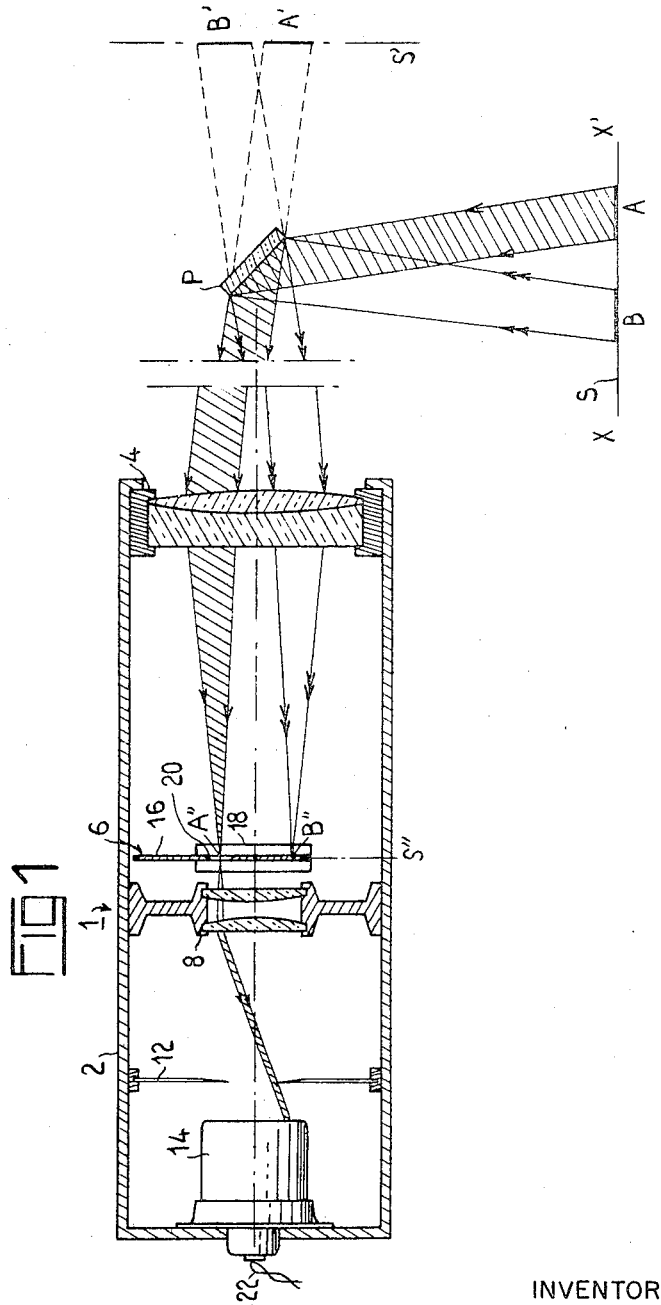
INVENTOR
JEAN PAUL GAFFARD

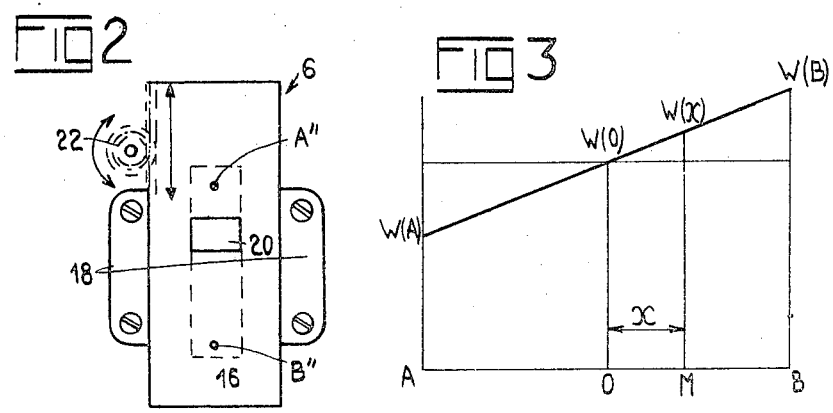
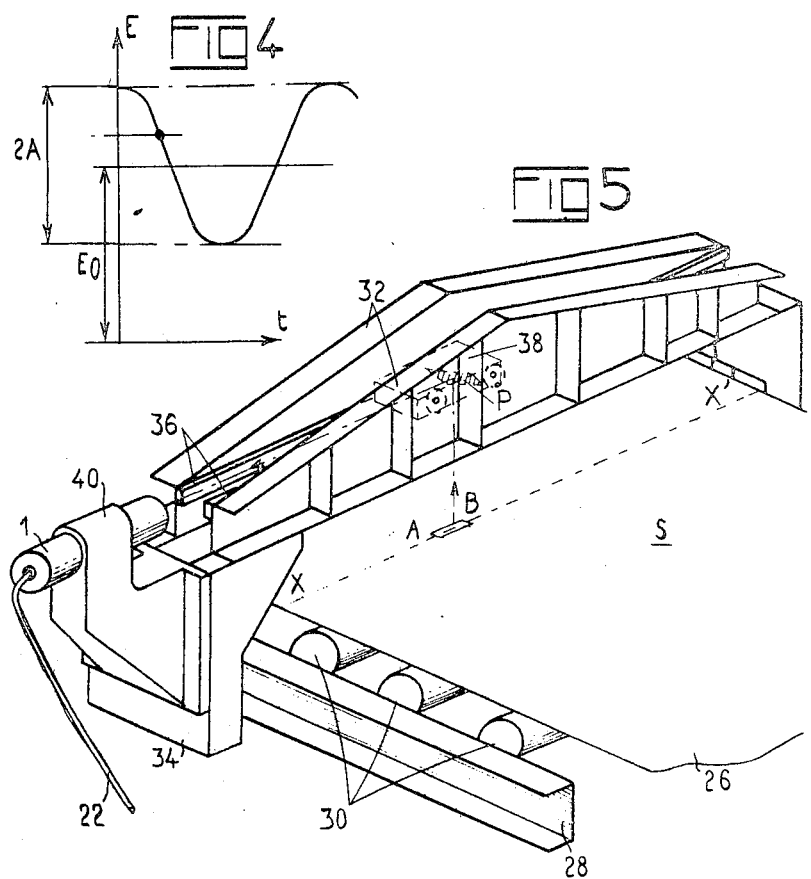

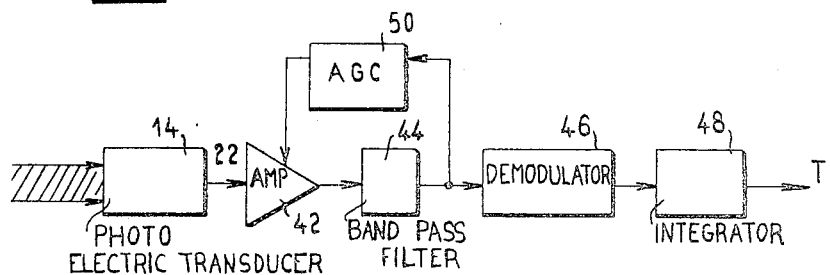
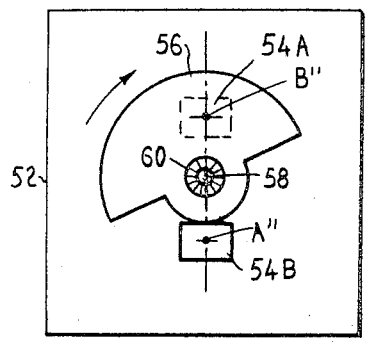
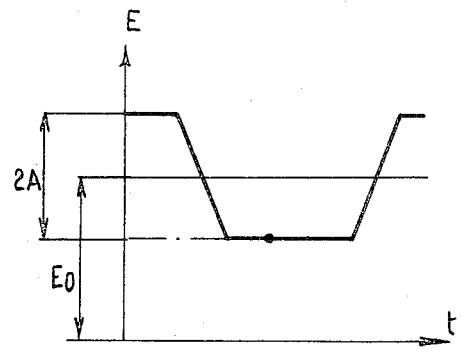

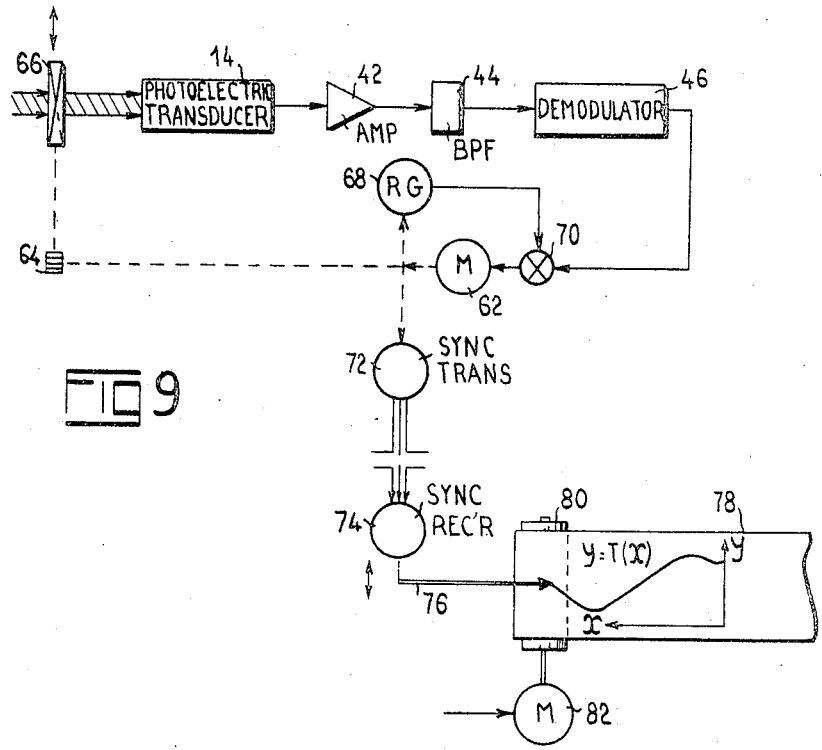
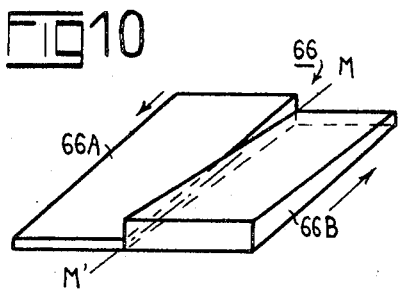
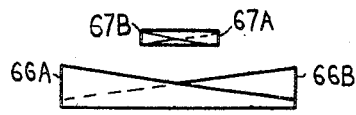
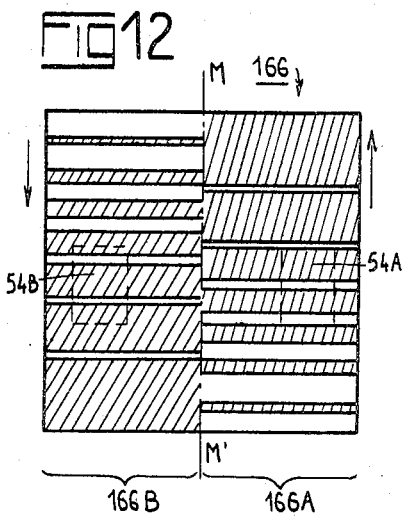

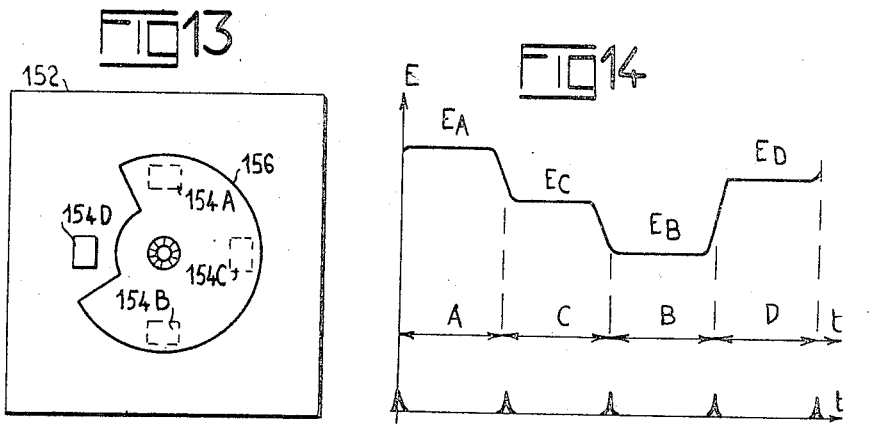
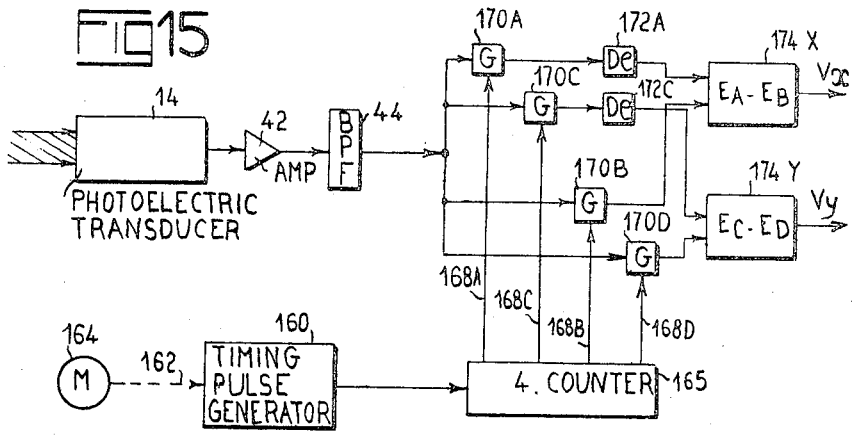
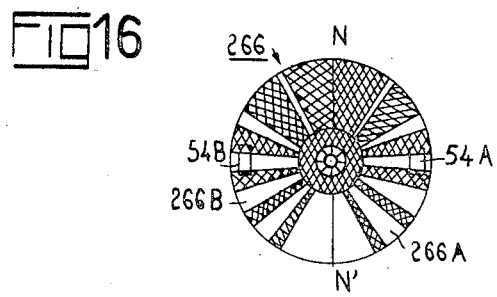

United States Patent Office 3,482,448
Patented Dec. 9, 1969

3,482,448
DIFFERENTIAL RADIATION PYROMETER SYSTEM
Jean Paul Gaffard, Plaisir, France, assignor to Societe Europenne de Materiels Speciaux, Paris, France, a corporation of France
Filed Apr. 13, 1966, Ser. No. 542,267
Claims priority, application France, Apr. 14, 1965, 13,168, Patent No. 1,440,073
Int. Cl. G01k 11/00; G01j 5/48
U.S. Cl. 73—355         4 Claims

ABSTRACT OF THE DISCLOSURE

A radiation thermometric system in which a device positioned in the path of a beam of radiant energy emanating from a limited area of a surface under investigation includes means for cyclically restricting the beam to different cross-sectional areas emanating from elementary region of the limited area of the surface and spaced in one direction of the surface from each other so that a transducer positioned to receive the beam and producing an electric signal corresponding to the energy received will deliver a cyclically varying signal corresponding to the energy radiated from the elementary regions so as to be indicative of a temperature gradient in said surface area along said direction.

---

This invention relates to the measurement of elevated temperatures, and one of its broad objects is to provide a high temperature indicating thermometric or pyrometer system that will be more sensitive and more convenient to use over a broad range of temperature than the systems heretofore available.

An object is to provide a high-temperature indicating thermometric system that will be well suited for monitoring and mapping the distribution of temperatures over a large surface, for example the surface of a sheet of material such as glass, plastic or metal during heat treatment, the surface of a mass of molten metal and other high-temperature surfaces.

In many important applications such as those enumerated above it is impractical to place a thermocouple or similar precision temperature measuring device in contact with the material whose temperature is to be measured. In such cases radiation pyrometers and optical pyrometers are used. In these instruments, radiation from the body whose temperature is to be measured is collected at a distance and is used as an indication of the temperature of the remote body. In the optical pyrometer, visible radiation is used, the brightness of the radiating body being visually compared with the brightness of an electrically heated filament. Such instruments are only usable at very high temperatures and have low accuracy. In total-radiation pyrometers, thermal energy from a surface area of the body under examination is focussed on a sensitive element such as a thermocouple, the electric output of which is used as an indication of the temperature of that area. Instruments in this class, of which there are various types extant, are subject to the basic difficulty that real surfaces all have emissive powers differing from one another and differing from the theoretical emissive power of an ideal black body, so that difficult calibration problems arise.

The present invention relates basically to an instrument of the radiation pyrometer class. However, it departs radically from the approach used in conventional apparatus of this class in that, rather than detecting the absolute temperature of an elementary region of the surface being investigated, it detects the temperature differential present between two (or more) closely-spaced elementary regions of the surface along one (or more than one) direction of the surface. The detected temperature differential (or differentials) provides an indication of the temperature gradient present on the surface in the area under consideration. Knowledge of the temperature gradient at each of a multiplicity of points of a surface provides a very convenient way of mapping the temperature distribution over the surface.

According to an important aspect of the invention, means are provided for scanning a broad surface so as to derive the temperature-differential (and hence temperature gradient) indications at each of a multiplicity of points thereof, and means for integrating said indications over the scanning displacement so as to obtain indications of temperature variation over the surface.

It will be apparent that the method just outlined leads to a determination of relative temperature values rather than absolute ones. Where desired, the relative temperature indications can easily be converted to absolute temperatures by a simple calibrating step with reference to a known temperature, i.e. by fixing the integration constant of the integrating means. However, the feature that the apparatus of the invention inherently provides relative not absolute temperature indications has great advantage. Error due to the fact that the emissive power of the body being examined departs from that of the ideal black body is eliminated or minimized. Because of the relative (rather than absolute) nature of the indications, it becomes possible to select any desired temperature as the reference or relative zero around which the temperatures are subsequently measured. This reference temperature can be chosen to correspond with the optimal performance characteristics of the system in any particular application.

An important specific object of the invention, therefore, is to proivde so-called differentiator devices which will be capable of performing the novel temperature-differential, and temperature-gradient, detecting operation referred to above.

The differentiator device, in one embodiment, may include an apertured diaphragm plate or mark which is reciprocated at a relatively high rate across the beam of radiant energy issuing from the high-temperature surface on its way to a photo-electric transducer, so that the aperture will sweep alternately across the beam between two end regions of the beam cross section, thereby modulating the beam in accordance with the temperature differential present between those two regions.

In another embodiment the differentiator device includes a fixed diaphragm plate positioned across the beam and having two (or more) spaced apertures therein, and a rotating mask or shutter, such as a sector plate, mounted adjacent the diaphragm plate is rotated at a relatively high rate so as cyclically to cover and uncover the apertures in succession, thereby again modulating the beam in accordance with the temperature differential (or differentials) present between the beam sections passed by the apertures.

In any such embodiment, or equivalent embodiment of the novel temperature differential sensing device of the invention, a conventional photoelectric transducer positioned to receive the modulated beam will deliver an output purportional to the temperature differential obtaining between two closely spaced points of the radiant surface, as required according to the novel process of the invention.

Exemplary embodiments of the invention will now be described with reference to the accompanying drawings, wherein:

FIG. 1 shows a system according to the invention partly in schematic form and partly in axial section through the sensor head;

FIG. 2 is a front view of one form of differentiator device;

FIG. 3 is an explanatory graph;

FIG. 4 is a graph representing the output signal obtained with a differentiator device of the type shown in FIG. 2;

FIG. 5 is a small-scale perspective view of an exemplary setup according to the invention for monitoring the temperature of a sheet of material;

FIG. 6 is a block diagram of one form of electronic signal chain for exploiting the output signal;

FIG. 7 shows another form of differentiator device;

FIG. 8 depicts the output signal obtained with the differentiator device of FIG. 7;

FIG. 9 shows another form of signal chain for exploiting the output signal, including a temperature recording device;

FIG. 10 is a perspective view of a dual or differential variable attenuator;

FIG. 11 is a cross section thereof further showing duration-compensator means;

FIG. 12 is a front view of another form of differential variable attenuator;

FIG. 13 shows a modified differentiator device;

FIG. 14 shows the corresponding output signal waveform;

FIG. 15 shows an exemplary output signal system usable with the differentiator device of FIG. 13; and FIG. 16 shows a differential variable attenuator device according to yet another embodiment.

Shown in FIG. 1 is the sensor head, generally designated 1, of a differential radiation pyrometer according to the invention. Sensor head 1 comprises a tubular body 2 of any suitable material opaque to visible and infrared radiations, e.g. metallic. An objective lens unit 4 is mounted in the open forward end of the tubular body. About midway of the length of the tubular body is a beam-differentiator device generally designated 6. Behind this is another, or collector, lens unit 8. Behind this, approximately in the conjugate plane of lens 4 as seen through lens 8, is a beam limiting diaphragm 12. At the rear end of the tubular body 2 is mounted a photoelectric transducer unit 14. Except for the differentiator device 1, later described in detail, the various components just enumerated as forming part of sensor head 1, may be generally conventional and mounted in the body 2 through conventional mounting means. The photo-electric transducer unit 14 may be any of various types of devices operating to produce an electrical output signal corresponding to the amount of beam energy received by it. Examples will be given later.

It will be understood that the radiant energy involved in the operation of the system is thermal electromagnetic radiation in a spectrum encompassing infrared and visible radiation depending on the temperature of the surface under examination. Such radiation even when lying outside the visible range is generally susceptible of treatment in ordinary optical elements such as lenses or mirrors. For this reason the energy beams may occasionally be referred to herein as light beams.

In use, the sensor head 1 is positioned to receive a beam of energy radiated from a high-temperature surface S being examined, such as the surface of plate glass from an annealing furnace, plastic or metal sheet during heat treatment, or the surface of a bath of molten metal. Means are provided for directing into the sensor head 1 a beam radiated from a limited area of the surface S, such area being indicated as the line segment AB in the drawing. As here shown, a plane mirror P is conveniently used for this purpose, the mirror P being supported through suitable means (an example of which will be presently described) above the surface S at a suitable angle to the horizontal. The surface area AB forms a virtual image A'B' in the plane mirror P. The objective lens 4 then forms a real image A"B" of said surface area in a plane S", normal to the optical axis of the sensor head. The differentiator device 6 is mounted so that its general plane coincides approximately with said image plane S".

It will be observed that the cross section of the beam entering sensor head 1 and hence the extent of the surface area AB, is limited by the dimensioning of mirror P, which thus constitutes the entrance pupil of the optical system in this embodiment. The remaining components in the sensor head are dimensioned and positioned to receive all of the entering beam, with the reservations presently to appear.

An embodiment of differentiator device 6 is shown in FIG. 2 as comprising a diaphragm strip 16 slidingly mounted in lateral guideways 18 secured to body 2, so that the strip 16 is reciprocable in its plane, vertically according to FIGS. 1 and 2. The diaphragm strip 16 is formed with a small aperture or window 20 which allows a small section of the total cross section of beam to pass through it. It will be understood that suitable fixed diaphragm plate means, not shown, are mounted in body 2 around the movable apertured plate 16 of the differentiator device to prevent any part of the beam from propagating past the differentiator device around the sides of the movable apertured plate.

Any suitable drive means, schematically shown in FIG. 2 as including a rack and pinion gearing 22, are provided for imparting the desired up-and-down reciprocation to the sliding shutter plate 16. Desirably, the movement is a harmonic or sinusoidal one. The reciprocation rate or frequency is not critical and may be varied over a very wide range. A lower limit for the range may be set by the requirement that the reciprocatory cycle should be relatively short as compared to the expected maximum time rate of temperature variations in the surface under investigation. Also, it may be preferred to use a relatively high rate of reciprocation in order to get a suitable frequency in the output alternating signal as will presently appear. The upper limit for the range of reciprocating frequencies is usually set by mechanical considerations. A range from 10 to 10,000 reciprocations per second may be regarded as generally suitable, but is not restrictive.

In the operation of the apparatus so far described, it will be apparent that during the reciprocation of apertured shutter plate 16, the aperture 20 therein sweeps repeatedly across the full width of the real image A"B" of the surface section AB under examination. In the upper end position of plate 16 (the position shown in FIG. 1), the narrow pencil of energy passed by aperture 20 to be directed through collector lens 8 into photoelectric transducer 14, is emanating from the end region A of the surface area AB, and its energy content corresponds to the temperature in that end region A. In the lower end position of plate 16, similarly, the pencil of energy passed through the aperture and striking transducer 14 is emanating from end region B, and its energy content corresponds to the temperature at B.

It will thus be understood that the energy reaching photoelectric transducer 14 will be modulated in accordance with the differential of energy content between the two end regions of the real image A"B", and hence in accordance with the temperature differential between the end regions of the surface area AB under investigation. It may further be understood that since the extent of surface area AB is fixed, the said temperature differential can be considered as a measure of the temperature gradient in the surface area AB. Therefore, the electrical output signal from transducer 14 will indicate said temperature differential, and also said temperature gradient.

The following summary mathematical treatment will clarify the above. The energy radiated from any point of a heated surface is known to be uniquely related to the temperature at that point, in accordance with Planck's law. In the graph of FIG. 3, the abscissae represent distances $x$ from the center point O of the segment AB of surface S. The ordinates represent the energies W radiated from the surface at each point. It will be apparent that the variations of temperature between A and B, and hence the variations in energy W, can to a first approximation be regarded as linear (physically this means simply that mirror P, FIG. 1, should be comparatively small). The energy $W(x)$ radiated from a point M of the surface at a distance $x$ from O can be expressed as a MacLaurin's series expansion with second and higher-order terms omitted, $$W(x) = W(O) + x \cdot W'(O)$$

which can be rewritten $$W(x) = \overline{W} + k \cdot x \qquad (1)$$

where $\overline{W}$ represents the average energy radiated from surface segment AB in all directions (or in a unit solid angle), and $k$ represents the gradient of the radiated energy along the direction AB, that is the quantity $$k = \frac{W(B) - W(A)}{AB}$$

Assuming the apertured shutter 16 of the differentiator device 6 of the invention is reciprocated sinusoidally at a rate of $f$ (c.p.s.), it will be apparent from Equation 1 that the energy reaching transducer 14 at any instant $t$, can be expressed as $$W(t) = \overline{W} + k \sin 2\pi f t \qquad (2)$$

The signal voltage delivered on output line 22 of photoelectric transducer 14, in that it is substantially proportional at any instant to the energy striking the sensitive element of the transducer, is seen to have the corresponding form:

$$E = E_0 + A \sin 2\pi f t \qquad (3)$$

This output voltage is seen to include (see FIG. 4) a D-C component $E_0$ corresponding to the average temperature of the surface area AB, and an alternating term $A \sin 2\pi f t$, corresponding in frequency to the frequency of the cyclic motion imparted to the differentiator shutter 16, and corresponding in amplitude A to the temperature gradient (hereinabove called $k$) in the surface area.

FIG. 5 illustrates an exemplary setup for the use of a differential sensor or differential radiation pyrometer of the invention. The surface S is shown as the surface of a sheet 26, e.g., sheet glass, travelling over a roller conveyor including the side members 28 and rollers 30 mounted thereon. Sheet 26 may be assumed to be fed continuously, or intermittently, over the conveyor say in the rightward direction of the drawing, e.g., from an annealing furnace. An overhead bridge structure 32 is supported across the conveyor between the side uprights 34. A track 36 is carried on the bridge 32, and a truck 38 is mounted on wheels running on the track 36. The plane mirror P (see FIG. 1) is supported on the truck 38 so as to have its reflecting surface directed at a downward angle of 45° to the vertical. The bridge structure 32 is formed with a slot between the tracks 36 so that the mirror "sees" the surface S of the sheet below. The sensor head 1 of FIG. 1 is shown supported on a bracket 40 mounted on one of the side uprights 34. It will be understood that in use, means are provided for reciprocating truck 38 over the tracks 36 at a suitable rate correlated with the feed of sheet 26 along the conveyor, by a conventional power drive not shown. The electric signal appearing on line 22 can then be used to map the temperature distribution over the surface of the sheet, as will be more clearly understood from the subsequent disclosure.

One simple form of electronic signal chain usable in exploiting the variable signal derived from the output 22 of the differential temperature sensing head 1 of the invention, is illustrated in the block diagram of FIG. 6. The variable signal E from the output line 22 of photoelectric transducer 14 is amplified in an amplifier 42. The amplified signal is passed through a bandpass filter 44 having a mid-frequency corresponding to the frequency of cyclic displacement of the differentiator device 6, so as to pass only a narrow frequency band surrounding the fundamental modulation frequency of the signal. The filtered signal is passed through a suitable synchronous demodulator 46 which produces a variable D-C voltage proportional in magnitude to the amplitude (A, FIG. 4) of the original alternating signal component, and corresponding in polarity to the phase of said alternating component. The variable output of the demodulator 46 is therefore proportional to the temperature gradient over the surface area AB being scanned in the present position of truck 38 and mirror P. The polarity of the demodulated output voltage indicates the sign of the temperature gradient, that is whether the temperature is increasing from A towards B or the reverse.

The temperature gradient indication can readily be converted to an indication of relative temperature, by applying the output from demodulator 46 to an integrator device 48, as here shown. Since the temperature gradient, by the definition, represents the derivative ($dT/dx$) of temperature over space, integrating the temperature gradient signal over a predetermined scanning interval will indicate the average temperature variation over the various regions of the surface area being tested. Integrator 48 may be any suitable device, mechanical, electromechanical or electronic, and may be analog or digital in character. An electromechanical integrating device, in the form of a rate servo, will be described in greater detail with reference to FIG. 9. Integrator 48 may also be a digital memory. Whatever the type of integrator used, the time parameter of the integration performed by it may be synchronized with the scanning displacement of the mirror P with respect to the surface S by any conventional means. If absolute temperature indications rather than relative temperature indications are desired, it is simply necessary to fix the integration constant of the integration step, as by performing a calibration operation. This may be done by exposing the sensor head 1 to a known temperature, or by determining the temperature at one point of surface S by some conventional instrument of sufficient accuracy, such as a thermocouple contacting the surface.

The signal chain of FIG. 6 is shown as further including an automatic gain control circuit 50 connected between the output of filter 44 and a gain-varying input of amplifier 42. The AGC loop serves to compensate for any variations in the over-all sensitivity of the system comprising sensor head 1 (including photoelectric transducer 14) and amplifier 42, and maintain a constant value for said overall gain. The AGC loop may be operated continuously or only during prescribed intermittent intervals.

FIG. 7 illustrates a modified form of a temperature-differential-sensing (or differentiator) device according to the invention. The device comprises an opaque diaphragm plate 52 fixedly mounted across the tubular body 2 of the sensor head 1 in the plane S of formation of the real image A″B″. Fixed plate 52 is formed with two spaced apertures 54A and 54B which register substantially with the images A″ and B″ of the end regions of the scanned surface area AB. A rotating shutter or sector disc 56 is mounted for rotation on a spindle 58 positioned centrally of plate 52, and drive means are provided for imparting rapid rotation to the sector plate 56. The drive means may, for example, comprise bevel gearing including a bevel pinion 60 carried by spindle 58 meshing with a bevel gear, not shown, carried by a drive shaft extending out of tubular body 2 in a direction normal to the axis thereof and to the line A″B″ and driven by a suitable electric motor externally of the body. When the sector disc 56 is driven at a suitable angular rate, e.g. in the range from 10 to 10,000 r.p.m., the apertures 54A and 54B are masked and unmasked in rapid alternation and the photoelectric transducer 14 will deliver a periodically varying electric signal of the form shown in FIG. 8. As shown, the waveform of such a signal is rectangular or trapezoidal rather than sinusoidal as that of the signal (FIG.

4) of the first-described differentiator device shown in FIG. 2. However, the characteristics of this output signal will be essentially similar, in that its D-C component $E_0$ is proportional to the average temperature of the scanned surface area AB, and the amplitude A of its alternating component is proportional to the temperature differential between the two points A and B, that is, proportional to the temperature gradient over the surface area AB. The temperature differential-sensing device illustrated in FIG. 7 is considered advantageous in that it involves continuous rotary motion rather than the reciprocatory motion required in the first embodiment.

FIG. 9 illustrates an alternative, and preferred, electromechanical system for the exploitation of the variable temperature gradient signal derived from the sensor head 1 of the invention. The system of FIG. 9 is in the nature of a zero follow-up system, and is here shown as serving to plot a temperature graph. In this system, the output from photo-electric transducer 14 is passed through a signal chain including an amplifier 28, bandpass filter 30 and demodulator 32 generally similar to the correspondingly numbered components in FIG. 5. The output from demodulator 32, instead of being applied to the input of an integrator circuit as in FIG. 5, is applied to the variable energizing input of a reversible, variable-rate servomotor 62, for example to the variable phase of a two-phase induction motor. The motor shaft is mechanically connected, e.g. through gearing including the pinion 64 and a rack not shown, to displace a variable light-attenuator or -absorber member 66 which is interposed in the path of the light beam ahead of the photo-electric converter 14. In the block diagram of FIG. 9, it will be understood that the light beam shown entering the photo-electric transducer 14 is viewed in a direction perpendicular to the viewing direction in FIG. 1, e.g. from the top of the sensor head 1 in FIG. 1. The dual or differential variable light-attenuator member 66 is so constructed, as will presently be disclosed in detail, that displacement of the member 66 in either of the two directions indicated by the two-headed arrow in the plane of FIG. 9, oppositely varies the attenuation introduced into the two halves of the light beam that respectively contain the end regions A" and B" of the image of the scanned area. For example, displacement of member 66 upward in the plane of FIG. 9 may be thought of as absorbing more of the light energy in end region B" and less of the light energy in region A", while downward displacement of member 66 produces an opposite result.

It will be clear with such an arrangement, that if the demodulated signal from demodulator 46 is of such a polarity (e.g. positive) as to indicate that the end region B" of the image is brighter than end region A" (that is, end region B of the scanned surface area is hotter than end region A), then the motor 62 can be made, by properly wiring the circuit connections, to displace member 66 in one direction (say upward in FIG. 9) so as to increase the light absorption in the part of the beam containing end region B" and decrease the absorption in the part of the beam containing end region A". If the demodulated signal is of the opposite (negative) polarity motor 62 will displace differential variable attenuator 66 downward to absorb less light in end region B" and more in end region A". In either case, motor 62 will remain energized and movement of member 66 will continue in the same direction so long as the amounts of light energy reaching photoelectric converter 14 from both end regions A" and B" of the image are unequal. When the displacement of member 66 is such that equality has been attained, the amplitude A of the signal delivered by converter 14 drops to zero, the output from demodulator 46 vanishes, and the motor 62 stops.

In this condition, the total displacement of the member 66 and hence the rotation of the shaft of motor 62, from a previous position of said member and shaft, are indicative of the temperature variation between the surface areas scanned at the instants under consideration. By the same token, the angular velocity of the shaft of motor 62 will at any time indicate the temperature gradient. In accordance with conventional servo-mechanism practice the relationship may be made more precise, and hunting of the system prevented, by providing a tachometer or rate generator 68, schematically indicated as being driven mechanically from the shaft of motor 62 and delivering a voltage proportional to motor shaft velocity which rate voltage is injected in negative feedback relationship through an algebraic summing circuit 70 into the energizing input of motor 62.

If the desired output information is the temperature gradient, this can be derived e.g. as the output voltage delivered by 70. Instead of or in addition to this, FIG. 9 illustrates the output of motor 62 as used to actuate a graph recorder positioned at a remote recording station. For this purpose, motor 62 has its shaft coupled to that of the transmitter 72 of a conventional self-synchronous transmitter and receiver. The output voltage of receiver 74 actuates the recording stylus 76 of a recording device, the stylus displacements being effected in the vertical direction of FIG. 9 across a suitable record medium such as a strip of paper 78. Strip 78 is shown mounted on a drum 80 driven in rotation, continuously or intermittently, from a motor 82. Motor 82 may constitute the receiver unit of a second self-synchronous remote-control system whose transmitter, not shown, may be operated in synchronism with the scanning displacement, e.g. the displacement of the carriage 38 supporting the scanning mirror P in FIG. 5. Under these conditions, it will be evident that the stylus 76 will record a temperature curve $T(x)$ on the strip 78, in the Cartesian coordinates shown, that is with a space coordinate $x$ longitudinally of the record strip 78 and the temperature values T as the ordinates $y$ transversely of the strip. Receiver 74 permits a manual null voltage adjustment.

In the system just described, it will be apparent that servo-motor 62 performs electromechanically the integrating function required to convert temperature-gradient information into temperature information. The temperatures indicated on the record curve $T(x)$ are basically relative temperatures. Should absolute temperature indications be desired, it would simply be necessary to determine the integration constant of the system, and for this purpose calibrate the system with a known temperature of fix a reference ordinate for the curve $T(x)$.

FIG. 10 illustrates one form of differential variable light attenuator or absorber member 64 usable in a system according to the embodiment of the invention just described. The member 66 is composed of two optical wedge elements 66A and 66B which are similar both as to their geometrical and optical characteristics, being made of any suitable neutral radiation-absorbing material as is well known in the optical art. The two wedge elements 66A and 66B are bonded together with a suitable adhesive resin along their edges so that their tapers are directed in opposite senses as shown. In use the member 66 shown in FIG. 10 is mounted on a suitable displaceable support, not shown, within the tubular body 2 of sensor head 1, ahead of the photo-electric converter 14, e.g. in the space between it and the collector lens 8. Alternatively the member 66 may be mounted ahead of the temperature differential-sensor device 6. In either case it will be understood that the mounting is such that the plane of joint MM' of both wedge elements 66A, 66B extends normal to the plane of the drawing in FIG. 1, and hence parallel to the plane of the drawing in FIG. 9, so that each of the wedge elements 66A and 66B are traversed by light issuing from the respective end regions A and B of the surface area being scanned, as earlier explained. Displacement of member 66 under control of motor 62 occurs in a direction parallel to line MM' in FIG. 10, that is, normally to the plane of the drawing in FIG. 1, and in the plane of the drawing in FIG. 9. As schematically shown in FIG. 11, a pair of fixedly mounted compensating wedges 67A and 67B may be supported through stationary mounting means not shown, in line with each of the wedge elements 66A and 66B respectively. The compensating wedges 67A and 67B have the same taper angles as wedges 66A and 66B but directed in reverse, as will be apparent from the drawings, so as to compensate for the deviations introduced into the light beam by the main or absorbing wedge elements.

FIG. 12 illustrates another construction of the dual variable attenuator member of the invention. The member, here designated 166, comprises a single rectangular plate of suitable transparent, or substantially non-absorbing, material, divided into two equal zones 166A and 166B by a median dividing line MM'. Each zone is subdivided into alternately transparent and opaque bands, as by selective deposit of carbon black on the surface of the plate. In each zone 166A and 166B, the width and/or spacing of the bands is so varied that the opacity of the plate gradually increases in one direction parallel to the midline MM', the opacity increasing in one sense (as from M towards M') in one zone 166B and increasing in the reverse sense (from M' towards M) in the other zone 166A. As here shown, the width of the opaque bands is increased and the inter-band spacing thereof is simultaneously decreased in the indicated direction, but other suitable arrangements may be used. In FIG. 12 the dual variable attenuator member 166 is assumed to be associated with a temperature differential sensor device of the type shown in FIG. 7 having two stationary apertures 54A and 54B, which apertures are indicated in FIG. 12 while the sector-shaped rotating shutter 56 is not here shown. The member 166 is mounted for displacement by motor 62 in directions parallel to line MM' in the plane of the figures. In the centered position of member 166 with respect to windows 54A and 54B, as shown in FIG. 12, it will be apparent that clear areas of equal combined width are presented to said windows by the respective plate zones 166A and 166B. If member 166 is displaced upward from this centered position, the attenuation of the beam through window 54A decreases and the attenuation of the beam through window 54B correspondingly increases, and the reverse occurs on downward displacement of member 166. While the attenuation through either window varies discontinuously or incrementally on displacement of the member, the difference between the variations in attenuation through both windows will be varied in a practically continuous manner, the difference being of course zero in the centered position of member 166 shown in the figure.

It will thus be apparent that a dual or differential variable-attenuation member of either of the types described with reference to FIGS. 10–11 and FIG. 12, will serve in a system of the general kind illustrated in FIG. 9 to restore equality between the amounts of radiation energy applied to photoelectric converter 14 from the two extreme regions of the scanned area, when said member is displaced by motor 62 a distance corresponding to the differential between the brightness of said two regions, and hence corresponding to the temperature differential between said two regions, as required in the zero follow-up system of FIG. 9.

The advantages of such a zero follow-up system which constitutes a preferred embodiment of the invention, arise out of the fact that the resulting measurements are independent, as to their sensitivity and accuracy, form the characteristics of any of the electronic components such as 42, 44 and 46 and hence independent from any variations in said characteristics due to aging or other causes. The measurement accuracy will depend substantially only on the initial characteristics of the differential variable absorption member 66 or 166, which are practically unchangeable with time, and on the precision with which said member is calibrated for a particular temperature measurement, when this may be required.

Differential radiation thermometric systems according to this invention are useful over a wide range of temperatures extending from somewhat above the ordinary ambient temperatures (say about 200° C.) to 3000° C. and much higher if required. For a particular application of the system, the nature of the photoelectric transducer 14 can readily be selected in dependency on the average temperature values with which the system is to be used. That is, the transducer 14 should be selected so as to be sensitive to the particular radiation wavelength, $\lambda_m$, in the spectral distribution for which the radiations has greatest intensity. In accordance with Wien's so-called displacement law, the peak wavelength $\lambda_m$ and the temperature T are related by the equation $$\lambda_m T = 2897$$

where $\lambda_m$ is expressed in microns and T in ° K.

Thus, if the temperatures to be monitored are low, say about 500° K., the formula indicates a peak wavelength $\lambda_m = 5.8$ microns. The transducer 14 may then be a suitable infrared detector, say one using indium antimonide InSb, preferably cooled. At higher temperatures roundabout 1000° K., for which $\lambda_m$ is about 3 microns, infrared detectors using lead sulfide and/or lead selenite may be used. At yet higher temperatures, of the order of 3000° K. and above, at which $\lambda_m$ is about 1 micron, the photoelectric transducer 20 may desirably comprise a photomultiplier, although photodiodes and phototransistors of the silicon or germanium types, may also be used. It should be understood that the above examples are merely illustrative, and that various types of infrared detector including bolometers, thermocouples and thermistors, in addition to photoconductors, may suitably be used as the photoelectric transducer 14.

A further modification of the invention is illustrated in FIGS. 13–15. FIG. 13 illustrates a modified differential brightness sensor analogous to that shown in FIG. 7 but wherein the fixed diaphragm disc 152 is formed with four angularly equispaced apertures 154A, 154C, 154B and 154D, instead of the two diametrically opposed apertures in FIG. 7. The rotatable sector plate 156 has an angular extent of three quarters of a circumference rather than a half circumference. It will be readily apparent that when a differential-sensor of this form is substituted into the apparatus shown in FIG. 1, the photoelectric transducer 14 will deliver an output voltage which will be of the form shown in FIG. 14, upper curve. This curve represents the output voltage over one full revolution of sector plate 156. During each of the four quarter-cycle periods indicated as A, C, B, D, the transducer 14 produces a voltage output level $E_A$, $E_C$, $E_B$, $E_D$ which represents the amount of radiation energy passed through the single unmasked aperture 154A, C, B or D respectively. Such an output signal can be exploited by means of an output system of the kind schematically shown in FIG. 15.

The output signal from transducer 14 is passed through a signal chain including amplifier 42 and bandpass filter 44 as in FIG. 6. A clock pulse generator 160 is provided, and is arranged to deliver a train of narrow spike pulses coincident in time with the instants in every rotational cycle of sector plate 156, at which that plate unmasks one of the four apertures 154 and begins to mask the next aperture. For this purpose, pulse generator 160 is schematically shown as connected by a synchronizing connection 162 with a motor 164 serving to drive the sector plate 156. The timing pulses delivered by generator 160 are indicated on the lower line of FIG. 14.

The timing pulse train from generator 160 is applied to a digital 4 counter 165. This 4-counter may be a simple arrangement of two bistable circuits or flip-flops and an associated decoder matrix using and-gates, connected in a well-known network so that the four output lines 168A, C, B and D of counter 165 are each energized in turn throughout the respective quarter-cycle periods, A, C, B and D of each set of four timing pulses corresponding to a full rotation of the sector plate. Each of the four counter output lines is applied to the enabling input of a respective one of four coincidence gates 170A, C, B and D, all of which receive at their signal input the output of filter 44. It will thus be evident that the output from each of the four gates will be energized during corresponding quarter-cycle period and will then carry a voltage level indicative of the radiation energy passed through the single unmasked window aperture in that period. The four voltage levels indicated as $E_A$, $E_C$, $E_B$, $E_D$ appear at the four corresponding gate output lines. Gated voltage $E_A$ and gated voltage $E_C$ are each passed through a respective delay line 172A and 172C, which impart a delay thereto corresponding to one-half the rotational cycle of the sector disc, or two timing clock periods. Delayed gated voltage $E_A$ and gated voltage $E_B$ are then applied subtractively to the inputs of a first algebraic summation network 174X while delayed gated voltage $E_C$ and gated voltage $E_D$ are applied subtractively to the inputs of a second algebraic summation network 174Y.

A consideration of the geometry of FIG. 13 will immediately show that the output voltage of algebraic adder 174X represents the component of the temperature gradient vector as measured in one direction of the monitored surface S, say the direction indicated as XX' in FIGS. 1 and 5, while the output voltage of algebraic adder 174Y represents the component of the temperature gradient vector in the perpendicular, or Y, direction.

In other words the output voltages $V_x$ and $V_y$ of networks 174X and 174Y are measures of the partial derivatives of temperature T with respect to the two coordinates, $V_x = \partial T/x$ and $V_y = \partial T/y$. The system of FIGS. 13–15, therefore, gives a determination of the bidirectional, or surface, gradient of temperature $$\frac{\partial T}{x}x + \frac{\partial T}{y}y = \overline{V}T = \text{grad } T$$

(where $x$ and $y$ are the unit vectors along the coordinate axes and $\overline{V}$ is the nabla operator of vector calculus), at any point on the monitored surface S. The output signals $V_x$ and $V_y$ may be exploited in various ways, for mapping the temperatures over the surface upon a sheet of paper in the form of isotherm contour lines (e.g. with an automatic graph plotter).

Generally equivalent results may be obtained using a temperature-differentiator device according to the invention of a general type similar to that shown in FIGS. 7 and 13, but wherein there are provided three angularly equispaced apertures in the fixed diaphragm disk, with a rotatable sector plate three quarters of a circumference in angular extent.

The variable attenuator devices of the type disclosed with reference to FIGS. 10–11 and 12 (and FIG. 16 presently described) provide a convenient means of calibrating the system, e.g. in regard to adjustment of the gain of amplifier 28 in an embodiment such as that of FIG. 6. The temperature differentiator device 6 may for this purpose be removed and the dual attenuator member 66 may be positioned and reciprocated at a rate corresponding to the reciprocation or rotation frequency normally used for the differentiator device. The sensor head 1 may then be directed at a surface area of uniform determined temperature. The photoelectric transducer 14 will under these conditions deliver an alternating signal having an amplitude determined exclusively by the well-defined differential absorption characteristics of the calibrated dual attenuator member 66, and the gain of the system can be adjusted to a desired corresponding value.

FIG. 16 shows a modification for the differential variable attenuator 266 which may be used according to the invention in place of the members shown in FIGS. 10 and 11 or FIG. 12. The attenuator member 266 in this case is in the form of a disc mounted for rotation in the tube 2 through means not shown and having a drive connection, such as gearing including a pinion centrally secured to the disc, as shown, for reversibly angularly displacing the disc from a motor such as motor 62 (FIG. 9) Disc 266 is divided by a diametric line NN' into two semicircular zones 266A and 266B. Each zone may be formed with alternating clear and opaque bands, which may be similarly arranged as the bands in member 166 of FIG. 12 except that they are radially disposed rather than being parallel spaced. The clear and opaque bands are disposed in the respective regions symmetrically to opposite sides of line NN', so that a rotation of disc 266 in either direction will increase the attenuation of light passed through one of the apertures 54A and 54B and will correspondingly increase the attenuation through the other aperture.

A rotatable differential variable attenuator member 266 of this type may be constructed to be readily insertable in place of the rotatable sector disc such as 56 or 156 (FIGS. 7 and 13) of the differentiator device, to facilitate the calibrating operations described above.

It will be understood that a great many modifications other than those specifically disclosed or referred to herein may be applied without departing from the scope of the invention.

Features disclosed with reference to different embodiments may be appropriately combined. The displaceable plane mirror P provides a convenient means of directing a limited beam from a surface area under examination into the sensor head, and effecting the scanning displacements, one of the advantages of this setup being the fact that it enables locating the sensor head at an increased distance from the high-temperature surface and thus increasing its durability. However, various other set-ups may be used for the purposes of forming a beam of radiant energy of limited cross section, directing the beam into the sensor head, and producing the desired relative scanning movement. Thus the sensor head may in some cases be directly aimed at the surface area under investigation through a suitable optics, and moved parallel to the surface for the scanning displacement.

The output signals from the system may be exploited in various ways, e.g. displayed digitally or otherwise, and/or used to perform various control, regulating and safety monitoring functions. The convenient nature of the output signals of the invention in the form of variable-amplitude alternating signals of selectable frequency, readily treated by standard electronic and digital techniques, constitutes an important advantage of the invention.

In addition to the advantages earlier indicated, which are inherent to the basic feature that the apparatus detects a temperature gradient and then integrates the gradient to obtain relative temperature, the system have high sensitivity and excellent stability, are relatively unaffected by extraneous signals and random noise, are easy to calibrate and are insensitive to drift and other variations in the characteristics of the optical and electrical components used therein.

What I claim is:

1. In a system responsive to radiant energy having means defining a beam of radiant energy and means defining within said beam a pair of transversely spaced cross-sectional beam areas, a differentially variable radiation-absorbing device interposable in the path of the beam for displacement in each of two opposite directions transversely relative to the beam, said device comprising a pair of absorbing sections of equal absorbing qualities arranged to be positioned across said respective cross-sectional areas of the beam, the absorption characteristic varying from one to the other end of each section, said sections being so arranged that on displacement of the device in one of said directions the absorption of beam energy is increased in one cross sectional area and correspondingly decreased in the other cross sectional area, while on displacement of the device in said opposite direction absorption is decreased in said one area and increased in said other area.

2. A differentially variable absorbing device as claimed in claim 1, wherein each of said sections comprises an optical wedge said wedges being fixedly assembled in generally coplanar relation with their tapers oppositely directed, and means for bodily displacing the assembled wedge sections in either of two opposite directions parallel to their directions of taper.

3. A differentially variable absorbing device as claimed in claim 1, wherein each said section comprises a plate formed with alternate clear and opaque bands having incrementally varied widths from one end to the other of the section, such that the radiation absorption through the two sections are varied in reverse senses on bodily displacement of the device in either of said directions.

4. In a radiation thermo-electric system, in combination, means defining a beam of radiant energy emanating from a limited surface area under investigation; a transducer positioned to receive the beam and producing an electric signal corresponding to the energy received; a device positioned in the path of the beam ahead of the transducer and including means cyclically operative to restrict the beam to different cross-sectional areas emanating from elementary regions of said surface area spaced along at least one direction of said surface from each other so that said transducer will deliver a cyclically varying signal; a differentially variable radiation absorbing device interposed in the path of said beam between said first-mentioned device and said transducer and displaceable to differentially vary the beam absorption in said different cross-sectional areas of said beam; means operated by said signal and connected to said absorbing device for displacing the latter so as to equalize the beam energy received by said transducer through said absorbing device from said different cross-sectional areas; and means indicating the displacement of said absorbing device to indicate the temperature difference between said regions.

References Cited

UNITED STATES PATENTS

| | | | |
|---|---|---|---|
| 2,008,793 | 7/1935 | Nichols | 73—355 XR |
| 2,439,373 | 4/1948 | Stearns. | |
| 2,494,607 | 1/1950 | Bouchet. | |
| 2,927,502 | 3/1960 | Watrous | 73—355 XR |
| 2,978,589 | 4/1961 | Howell. | |
| 3,055,263 | 9/1962 | Kuehne. | |
| 3,057,253 | 10/1962 | Johnson | 88—22.5 |
| 3,163,700 | 12/1964 | Williamson | 73—355 XR |

LOUIS R. PRINCE, Primary Examiner

FREDERICK SHOON, Assistant Examiner

U.S. Cl. X.R.

356—43